United States Patent Office 3,780,132
Patented Dec. 18, 1973

3,780,132
PRIMER COMPOSITION CONTAINING EPOXIDE RESINS, PHENOL FORMALDEHYDE RESIN, TETRAALKYL SILICATES, AND SILANE COUPLING AGENTS
James E. Lohr, Wallingford, Pa., assignor to E. I. du Pont de Nemours and Company, Wilmington, Del.
No Drawing. Continuation-in-part of abandoned application Ser. No. 170,288, Aug. 9, 1971. This application Dec. 22, 1971, Ser. No. 211,085
Int. Cl. C08g 45/08
U.S. Cl. 260—831
7 Claims

ABSTRACT OF THE DISCLOSURE

The primer composition is utilized as a primer for aluminum sheets which are bonded together with an epoxy adhesive or as a primer for an aluminum sheet which is bonded to an aluminum honeycomb structure; the primer is a solution containing a heat reactive phenol/formaldehyde resin, one or more epoxy resins, a tetraalkyl silicate and a silane coupling agent.

CROSS REFERENCE TO RELATED APPLICATIONS

This application is a continuation-in-part of Ser. No. 170,288, filed Aug. 9, 1971, now abandoned.

BACKGROUND OF THE INVENTION

This invention relates to a primer composition, and in particular, to a unique primer composition for an aluminum substrate. The primer composition has excellent adhesion to an aluminum substrate and has outstanding resistance to elevated temperature and high humidity conditions.

Epoxy adhesives have been widely used in the aircraft industry to bond together aluminum parts. However, failures of these bonds have occurred within hours under conditions of intermediate stress and elevated temperature and high humidity, for example, 50° C. and 95% R.H. and a tensile stress equal to about 30% of the original ultimate strength of the bond. To reduce these adhesive bond failures, the aluminum substrate was primed with a composition based on a phenolic resin and a polyamine that also contained chromates to inhibit corrosion. However, the epoxy adhesive failed within several days under the aforementioned conditions. Failure primarily occurred at the substrate and not in the epoxy adhesive bond. The novel primer composition of this inventon has excellent adhesion to aluminum substrates and provides a surface to which the epoxy adhesive will adhere and the primer does not fail when subjected to stress and elevated temperature and high humidity conditions for at least a thirty-day period. This represents a substantial improvement over prior art compositions.

SUMMARY OF THE INVENTION

The novel primer composition of this invention comprises 1–30% by weight, based on the weight of the primer composition, of a film-forming binder composition dissolved in an organic solvent, wherein the binder composition consists essentially of 30–89.9% by weight, based on the weight of the binder composition, of a heat reactive phenol formaldehyde resin characterized by having a gel time of less than 10 minutes, measured at 160° C.;

5–65% by weight, based on the weight of the binder composition, of an epoxy novolac resin of the formula

[structural formula]

where $n$ is 0 to 3;

0–65% by weight, based on the weight of the binder composition, of an epoxy hydroxy polyether resin of the formula

[structural formula]

where $n$ is a positive integer sufficiently large to give an epoxide equivalent [1] of 180 to 2,500 and $R^1$ is selected from the group consisting of $$-CH_2- \text{ and } -\underset{CH_3}{\overset{CH_3}{\underset{|}{\overset{|}{C}}}}-$$

1–5% by weight, based on the weight of the binder composition, of a tetraalkyl silicate having 1–20 carbon atoms in the alkyl group; and 0.1–5% by weight, based on the weight of the binder composition, of a silane coupling agent.

DESCRIPTION OF THE INVENTION

The novel primer composition of this invention has a film-forming binder content of 1–30% by weight, and preferably, 10–20% by weight. The composition is prepared by blending the ingredients together in a suitable solvent to form the composition utilizing standard blending procedures.

The novel primer composition contains 30–89.9% by weight, based on the weight of the binder in the composition, of the heat reactive phenol formaldehyde resin, and preferably, 65–75% by weight of this resin is used. The phenol formaldehyde resin is characterized by having a gel time of less than 10 minutes when measured at 160° C. Preferably, the resin has a gel time of 85–100 seconds.

The gel time of the resin is measured by spreading a 1-gram sample of resin over a 2-square-inch area of a platen heated to 160° C. About one and one-quarter inches of a metal spatula is placed in contact with the resin and moved across the surface of the resin using one stroke per second. The time required for the resin to form a rubber-like material that does not adhere to the spatula is the gel time.

The novel primer composition contains 5–65% by weight, based on the weight of the binder composition of an epoxy novolac resin of the formula

[structural formula]

where $n$ is 0 to 3. Preferably, 10–20% by weight of the epoxy novolac resin is used wherein $n$ is 0–2.

---
[1] Epoxide equivalent—grams of resin that contain 1 gram equivalent of epoxide.

Up to 65% by weight, based on the weight of the binder composition, of an epoxy hydroxy polyether resin is used. The epoxy resin has the following formula

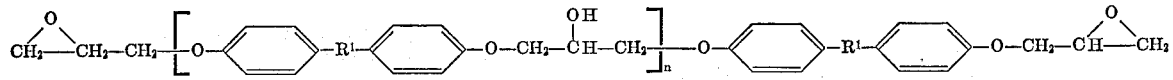

where n is a positive integer sufficiently large to give an epoxide equivalent of 180 to 2,500 and where $R^1$ is either

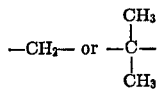

Preferably, 5–15% weight of an epoxy resin is used that has an epoxide equivalent of 425–700. Preferably, 5–15% by weight of the epoxy hydroxy polyether resin is used.

The novel binder composition contains 1–5% by weight, based on the weight of the binder composition, of tetraalkyl silicate that has 1–20 carbon atoms in the alkyl group and preferably, 1–8 carbons in the alkyl group.

The tetraalkyl silicate provides the novel primer composition with corrosion inhibiting properties which are necessary under the high humidity conditions. Preferably, about 2–4% by weight of the tetraalkyl silicate is utilized in the novel primer composition.

Typical silicates that can be used are tetramethylorthosilicate, tetraethylorthosilicate, tetrapropylorthosolicate, tetraisopropylorthosilicate, tetrabutylsilicate, terapentylsilicate, tetrahexylsilicate, tetraorthooctylsilicate, tetranonylorthosilicate, tetralauryl silicate, tetrasterylsilicate. Tetraethylorthosilicate is the preferred constituent.

About 0.1–5% by weight, based on the weight of the binder of the composition, preferably 1–3% by weight of a silane coupling agent is utilized. Typical silane coupling agents are as follows: epoxycyclohexylalkyltrialkoxy silane, such as β-(3,4-epoxycyclohexyl)-ethyltrimethoxy silane, glycidoxyalkyltrialkoxy silane, such as gamma-glycidoxypropyltrimethoxy silane, mercaptoalkyltrialkoxy silane, such as mercaptopropyltrimethoxy silane, aminoalkyltrialkoxy silane, such as gamma-aminopropyltriethoxy sillane, (aminoalkyl)-aminoalkyltrialkoxy silane, such as N-β-(aminoethyl)-gamma-aminopropyltrimethoxy silane.

The following are preferred binder compositions used in the novel primer of this invention:

(1) 70% by weight of the heat reactive phenol formaldehyde resin, 15% by weight of the epoxy novolac resin where n is 0, 10% by weight of the epoxy resin where $R^1$ is

and the resin has an epoxide equivalent of about 425–550, 1.7% by weight of gamma-glycidoxy-propyltrimethoxy silane, and 3.3% by weight of tetraethylorthosilicate; or (2) 65% by weight of the heat reactive phenol formaldehyde resin, 15% by weight of the epoxy novolac resin where n is 0, 15% by weight of an epoxy resin where $R^1$ is

and the resin has an epoxide equivalent of 425–550, 3.3% by weight of tetraethylorthosilicate, and 1.7% by weight of gamma-glycidoxypropyltrimethoxy silane.

The novel primer composition of this invention can be applied by the conventional techniques such as brushing, roller coating, flow coating, reverse roller coating, spraying, electrostatic spraying and the like. The primer composition has excellent adherence to metal substrates, in particular, aluminum, and it also useful as a primary protective coating for metal substrates, for example, as a exterior coating for metal containers.

It is preferable to clean and treat the substrate before application of the novel primer compoistion. The following method is extremely useful for aluminum substrates to provide a surface to which the primer will adhere:

(1) The metal is cleaned with a solvent of acetone or perchloroethylene;

(2) The metal is vapor degreased by exposure for 30 seconds to trichloroethylene vapors;

(3) The metal is soaked for 10–15 minutes in an alkaline cleaning solution at 70° C.;

(4) The metal is then rinsed with tap water;

(5) The metal is then acid etched by immersing the metal for 10–15 minutes in a solution maintained at 70° C. of 30 parts of deionized water and 10 parts of concentrated sulphuric acid and 1 part of sodium dichromate;

(6) The metal is then rinsed with tap water and then with deionized water;

(7) The metal is then dried in an oven for 30 minutes at 75° C.

After the metal has been cleaned, the novel primer composition is applied. The primer is cured at about 125–175° C. for about 2–30 minutes to form a primer coating on the metal substrate about 0.1–1.0 mil in thickness. The epoxy adhesive is then applied to the primed substrate and the primed metal substrate is placed in firm adherence with the adhesive to form the bond. The adhesive bond is then cured at about 200–275° C. for about 30 to 120 minutes. To form acceptable adhesive bond, the bond should withstand a stress of 2000 pounds per square inch at 50° C. and 95% relative humidity for four or more weeks.

Laminate having a metal honeycomb interior can be prepared with the novel primer composition. For example, an aluminum sheet is coated with the primer and the primer is cured; an epoxy adhesive is then applied and an aluminum honeycomb structure is then positioned on the primed sheet. A second aluminum sheet primed with the novel composition and having an epoxy adhesive layer is then placed on the aluminum honeycomb to form the laminate.

Typical adhesives that are utilized are of epoxy resins and blends of epoxy resins with other resins. Hardners, catalysts are generally blended with the adhesive composition.

An adhesive composition that forms highly durable bonds in combination with the above primer composition contains:

85–90% by weight of an epoxy hydroxy polyether resin or a blend of epoxy hydroxy polyether resins having an epoxide equivalent of 100–450, and 5–15% by weight of a butadiene/acrylonitrile copolymer having reactive carboxyl groups.

The butadiene/acrylonitrile copolymer has the formula

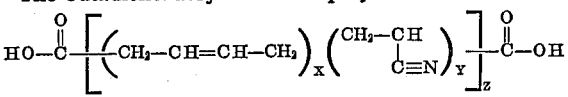

where X, Y and Z are positive integers sufficiently large to provide a viscosity at 27° C. of about 100,000–120,000 centipoises.

A suitable catalyst and curing system is added to the adhesive to enhance the cure of the adhesive. Typical compounds that can be used are dicyandiamide, thioameline, sodium phenyl cyanamide, dithiobiuret, ethylene thiourea, diallylmelamine, acetoguanamine, melamine, benzoguanamine, 3-amino-1,2,4-triazole, adipamide, and the like.

One particularly useful adhesive is a blend of one or more of the aforementioned epoxyhydroxy polyether resins, the butadiene/acrylonitrile copolymer having reactive carboxyl groups, diglycidyl ether of 1,4-butane diol, dicyandiamide and an accelerator such as N-(N'-p-chlorophenyl carbamoyl) pyrrolidine.

The novel primer composition can contain small amounts of dyes or toners to add color to the primer making it possible to easily identify the areas to which the primer has been applied. If the novel primer composition is utilized for other purposes, such as an exterior coating for beverage cans, dyes or pigments may be added to give the coating color. The conventional dyes or pigments can be blended with the novel primer compositions and uniformly dispersed therein in a pigment to binder ratio of 1:100 to 50:100.

The following examples illustrate the invention. All percentages and parts are by weight unless otherwise indicated.

EXAMPLE 1

The following ingredients are blended together to form the primer composition:

| | Parts by weight |
|---|---|
| A heat reactive phenol formaldehyde resin solution (60% solids of a phenol formaldehyde resin in ethylalcohol, the resin having a gel time at 160° of about 85–110 seconds) | 70.0 |
| Epoxy novolac resin (having the formula described herein and where $n$ is 0) | 15.0 |
| Epoxyhydroxy polyether resin (having the formula described herein and having an epoxide equivalent of 425–550 where $R^1$ is $-\underset{\underset{CH_3}{\mid}}{\overset{\overset{CH_3}{\mid}}{C}}-$ | 10.0 |
| Tetraethylorthosilicate | 3.3 |
| Gamma-glycidoxypropyltrimethoxy silane | 1.7 |
| Total | 100.0 |

After the above ingredients are thoroughly blended together, the mixture is then diluted to 10% solids content with methylethyl ketone to give a clear solution having a very low viscosity. Two aluminum sheets are then sprayed with the primer composition and then are allowed to air dry at room temperature for about 30 minutes and then the sheets are baked for 1 hour at 125° C. to give a film about 0.2–0.3 mil in thickness.

An adhesive composition is then prepared by blending the following ingredients to form a dispersion:

| | Parts by weight |
|---|---|
| Diglycidylether-1,4-butane diol | 600 |
| Dicyandiamide | 233 |
| N-(N'-p-chlorophenyl carbamoyl)pyrrolidine | 233 |
| Total | 1066 |

These ingredients are charged into a conventional ball mill and milled over a 16 hour period to form a uniform dispersion.

The preparation of the adhesive is continued by charging the following ingredients into a reaction vessel equipped with a stirrer, a heating mantel while holding the ingredients under a nitrogen atmosphere:

| | Parts by weight |
|---|---|
| Portion 1: Butadiene/acrylonitrile copolymer containing reactive carboxyl groups | 36 |
| Epoxyhydroxy polyether resin (having the formula described herein where $R^1$ is $-\underset{\underset{CH_3}{\mid}}{\overset{\overset{CH_3}{\mid}}{C}}-$ and having an epoxide equivalent of 230–280) | 120 |
| Portion 2: Epoxyhydroxy polyether resin (described above) | 78 |
| Portion 3: Epoxyhydroxy polyether resin (having the formula described herein where $R^1$ is $-\underset{\underset{CH_3}{\mid}}{\overset{\overset{CH_3}{\mid}}{C}}-$ and an epoxide equivalent of 2,000–2,500) | 39 |
| Portion 4: Dispersion (prepared above) | 48 |
| Total | 321 |

Portion 1 is charged into the reaction vessel and heated to a temperature of 165° C. and maintained at this temperature for 1 hour. Portion 2 is then added and the reaction mixture is held at this temperature for one hour. Portion 3 is added and the reaction mixture is held at the above temperature for an additional hour. The reaction mixture is then cooled to about 95° C. and Portion 4 is added, thoroughly mixed with the ingredients for about 10 minutes while the reaction mixture cools to 75° C.

The above adhesive composition is then rolled into a 10-mil thick sheet by passing the composition through a nip roller between two sheets of release paper to form a 10-mil thick sheet. The 10-mil thick adhesive sheet is placed on one of the primed surfaces of the aluminum sheet prepared above and then a second primed aluminum sheet is placed in firm adherence with the first sheet. The aluminum sheets are pressed together for one hour at 125° C. applying sufficient pressure to hold the aluminum sheets in contact with the adhesive. The bond is then tested at 95% relative humidity and 50° C. and under 2000 pounds per square inch tensile stress. The bond had excellent adhesion for about a 30-day period.

The following comparison is made between the novel primer composition of this invention and the commercially available primer compositions to determine the strength of the adhesive bond. Eight aluminum strips 3 x 1 x 0.063 inches of a 2024–T3 Alclad aluminum are sprayed with the above primer composition and then dried and baked as above giving a primer film thickness about 0.2–0.5 mil thick. A ½-inch square tensile shear bond is then formed with each pair of the aluminum strips by positioning a ½-inch square 10-mil thick sheet of the above prepared adhesive between the aluminum strips and pressing the two strips together for 1 hour at 125° C. Each of the bonded aluminum strips are then placed in an assembly which applies a tensile stress of 2000 p.s.i. and the strips are subjected to 50° C. and 95% relative humidity. It took an average of 29 days to break the bonds. The above test is duplicated except bare aluminum strips are utilized instead of the Alclad aluminum strips, and in this case, it took an average of 30 days to break the bonds.

The identical test was repeated using both the Alclad and bare aluminum strips except commercial phenolic based primer containing chromate corrosion inhibitors is utilized as the primer composition. This resin was diluted to a 10% solids using methylethyl ketone as above and the test was repeated with the above adhesive under the same conditions. Failure of these bonds under the identical temperature and humidity conditions occurred within an average of two to three days.

EXAMPLE 2

The following ingredients are blended together to form a primer composition:

| | Parts by weight |
|---|---|
| Phenol formaldehyde resin solution (described in Example 1) | 65 |
| Epoxy novolac resin (described in Example 1) | 15 |
| Epoxyhydroxy polyether (described in Example 1) | 15 |
| Tetraethylorthosilicate | 3.3 |
| Gamma-glycidoxypropyltrimethoxy silane | 1.7 |
| Total | 100.0 |

The above ingredients are thoroughly blended together and then diluted with methylethyl ketone to a 10% solids content. This composition is then sprayed onto an aluminum panel and dried and baked as in Example 1 giving a film thickness of about 0.2-0.5 mil. The aluminum sheets are then bonded together as in Example 1 using the identical adhesive. The resulting adhesive bond had high strength and excellent stability even when exposed to high temperature and humidity conditions.

EXAMPLE 3

An adhesive composition is prepared as follows:

| Butadiene/acrylonitrile copolymer— | Parts by weight |
|---|---|
| $\left(\mathrm{HO-C(=O)-[CH_2-CH=CH-CH_2]}_x\right.$ $\left.-(\mathrm{CH_2-CH(C\equiv N)})_y-]_z -\mathrm{C(=O)-OH}\right)$ X, Y and Z are positive integers sufficiently large to provide a viscosity at 27° C. of about 100,000-120,000 centipoises) | 8.0 |
| Epoxyhydroxy polyether resin (having the formula described herein where R¹ is $-\mathrm{C(CH_3)_2}-$ and having an epoxide equivalent of about 230-280) | 30.0 |
| Epoxyhydroxy polyether resin (having the formula described herein where R¹ is $-\mathrm{C(CH_3)_2}-$ and having an epoxide equivalent of about 425-550) | 32.0 |
| Epoxyhydroxy polyether resin (having the formula described herein where R¹ is $-\mathrm{C(CH_3)_2}-$ and having an epoxide equivalent of about 2,000-2,500) | 22.0 |
| Diglycidyl ether of 1,4-butane diol | 8.0 |
| Total | 100.0 |

The above ingredients are blended together using the procedure described in Example 1.

The following blend of catalyst and curing agent is then prepared and added to the above adhesive composition:

| | Parts by weight |
|---|---|
| Dicyandiamide | 3.0 |
| N-(N'-p-chlorophenyl carbamoyl) pyrrolidine | 3.0 |
| Total | 6.0 |

The resulting adhesive composition has an epoxide equivalent weight per 100 parts of adhesive of 396.

Two aluminum sheets are primed using the primer composition of Example 1 to provide a primer film of about 0.2-0.3 mil thick. The above adhesive composition is applied over the primed aluminum sheet to a thickness of about 5 mils and the sheets are held together under a slight pressure for about 1 hour at 125° C. The bond is then tested as in Example 1. The bond exhibits excellent adhesion for a 30-day period.

Two unprimed aluminum sheets are bonded together using the same adhesive and procedure and tested as above. The bond failed after 2-3 days.

The invention claimed is:

1. The primer composition comprising 1-30% by weight, based on the weight of the primer composition, of a film-forming binder composition dissolved in an organic solvent; wherein the binder composition consists essentially of 30-89.9% by weight, based on the weight of the binder composition of a heat reactive phenol formaldehyde resin characterized by having a gel time of less than 10 minutes measured at 160° C.;

5-65% by weight, based on the weight of the binder composition, of an epoxy novolac resin of the formula

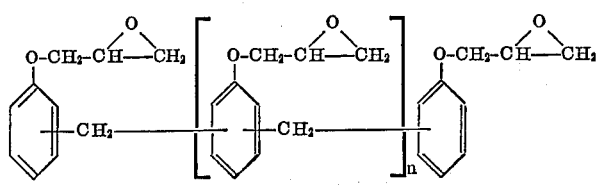

wherein $n$ is 0 to 3;

0-65% by weight, based on the weight of the binder composition, of an epoxy hydroxy polyether resin of the formula

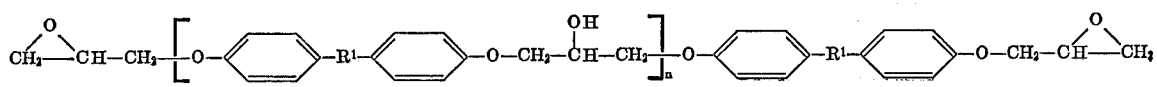

where $n$ is a positive integer sufficiently large to give an epoxide equivalent of 180 to 2,500 and $R^1$ is selected from the group consisting of

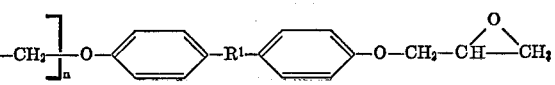

1-5% by weight, based on the weight of the binder composition, of a tetraalkyl silicate having 1-20 carbon atoms in the alkyl groups; and 0.1-5% by weight, based on the weight of the binder composition, of a silane coupling agent.

2. The primer composition of claim 1 containing 10–20% by weight of the film-forming binder composition and the binder composition consists essentially of 65–75% by weight, based on the weight of the binder composition of the heat reactive phenol formaldehyde resin;

10–20% by weight, based on the weight of the binder composition, of the epoxy novolac resin;

5–15% by weight, based on the weight of the binder composition, of the epoxy hydroxy polyether resin;

2–4% by weight, based on the weight of the binder composition, of a tetraalkyl silicate having 1–8 carbon atoms in the alkyl group; and

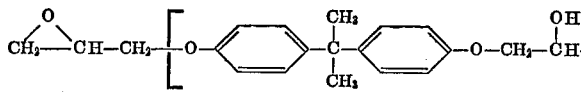

1–3% by weight, based on the weight of the binder composition, of the silane coupling agent.

3. The coating composition of claim 2 in which the silane coupling agent is selected from the group consisting of an epoxycyclohexylalkyltrialkoxy silane, glycidoxyalkyltrialkoxy silane, mercaptoalkyltrialkoxy silane, aminoalkyltrialkoxy silane, and (aminoalkyl) aminoalkyltrialkoxy silane.

4. The primer composition of claim 3 in which the binder consists essentially of 70% by weight of the heat reactive phenol formaldehyde resin, having a gel time of 85–110 seconds at 160° C., 15% by weight, of an epoxy novolac resin where n is 0, 10% by weight of an epoxyhydroxy polyether resin where R¹ is

and the resin has an epoxide equivalent of 425–550; 3.3% by weight of tetraethylorthosilicate; and 1.7% by weight of gamma-glycidoxypropyltrimethoxy silane.

5. The primer composition of claim 3 in which the binder comprises 65% by weight of the reactive phenol formaldehyde resin, having a gel time of 85–110 seconds at 160° C., 15% by weight of the epoxy novolac resin where n is 0, 15% by weight of the epoxyhydroxy polyether resin where R¹ is

and has an epoxide equivalent of 425–550, 3.3% by weight of tetraethylortho silicate, and 1.7% by weight of gamma-glycidoxypropyltrimethoxysilane.

6. The primer composition of claim 3 in which the epoxyhydroxy polyether resin is of the formula

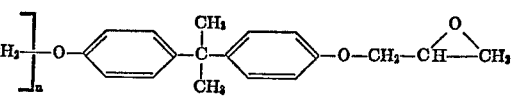

having an epoxide equivalent of 425–700.

7. A coating composition comprising 5–30% by weight, based on the weight of the coating composition of a film forming binder composition, dissolved in an organic solvent and having pigments uniformly dispersed therein in a pigment to binder ratio of 1:100 to 50:100; wherein the binder composition consists essentially of the binder composition of claim 1.

References Cited
UNITED STATES PATENTS

| | | | |
|---|---|---|---|
| 3,051,681 | 8/1962 | Partansky | 260—831 |
| 3,200,172 | 8/1965 | Renner | 260—831 |
| 3,264,369 | 8/1966 | Ephraim | 260—831 |
| 3,367,990 | 2/1968 | Bremmer | 260—831 |
| 3,383,433 | 5/1968 | Salensky | 260—831 |

PAUL LIEBERMAN, Primary Examiner

U.S. Cl. X.R.

117—135.1; 161—68; 260—38, 830 TW, 837